(12) United States Patent
Ikeda

(10) Patent No.: US 7,518,625 B2
(45) Date of Patent: Apr. 14, 2009

(54) IMAGE FORMING APPARATUS AND ASSOCIATED METHODOLOGY OF FORMING AN ENLARGED IMAGE

(75) Inventor: Yoshito Ikeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

(21) Appl. No.: 11/466,676

(22) Filed: Aug. 23, 2006

(65) Prior Publication Data

US 2007/0046772 A1 Mar. 1, 2007

(30) Foreign Application Priority Data

Aug. 24, 2005 (JP) ............... 2005-243419

(51) Int. Cl.
*B41J 2/435* (2006.01)
*B41J 2/47* (2006.01)
*H04N 1/393* (2006.01)

(52) U.S. Cl. ............... 347/234; 347/248; 358/451

(58) Field of Classification Search ............... 347/229, 347/234–235, 248–250; 358/449–453
See application file for complete search history.

(56) References Cited

U.S. PATENT DOCUMENTS 5,428,459 A * 6/1995 Asai ............... 358/449

| | | | |
|---|---|---|---|
| 6,654,042 B2 | 11/2003 | Ikeda | |
| 6,879,334 B2 | 4/2005 | Ikeda | |
| 6,998,603 B2 | 2/2006 | Ikeda | |
| 2003/0076402 A1* | 4/2003 | Asakura | ............... 347/234 |
| 2005/0024483 A1 | 2/2005 | Ikeda | |

FOREIGN PATENT DOCUMENTS

| | | |
|---|---|---|
| JP | 9-109446 | 4/1997 |
| JP | 10-173909 | 6/1998 |
| JP | 2002-96505 | 4/2002 |
| JP | 2002-137450 | 5/2002 |

* cited by examiner

*Primary Examiner*—Hai C Pham
(74) *Attorney, Agent, or Firm*—Oblon, Spivak, McClelland, Maier & Neustadt, P.C.

(57) ABSTRACT

An exposing unit optically writes respective color-separated image data on a photosensitive drum to form a latent image by using both a forward direction scanning and a backward direction scanning. A writing control unit outputs input pixel data to the exposing unit a plurality of times for enlarging and printing an input image. The writing control unit includes an output unit that outputs a main-scanning effective gate signal of dot period lengths of common multiples of all available enlargement ratios; and a suppressing unit that suppresses an output of a pixel signal to an outside of a printing range.

20 Claims, 19 Drawing Sheets

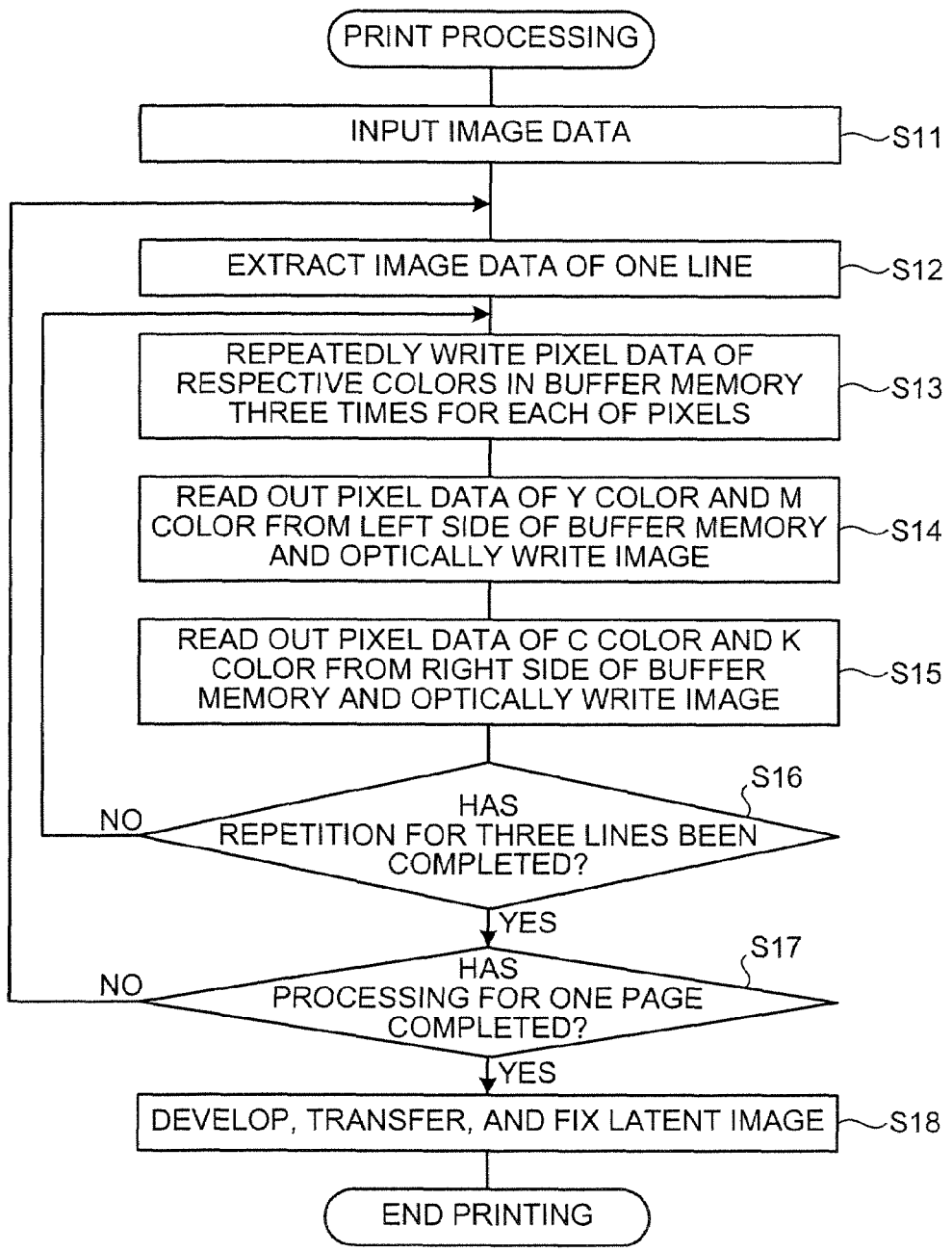

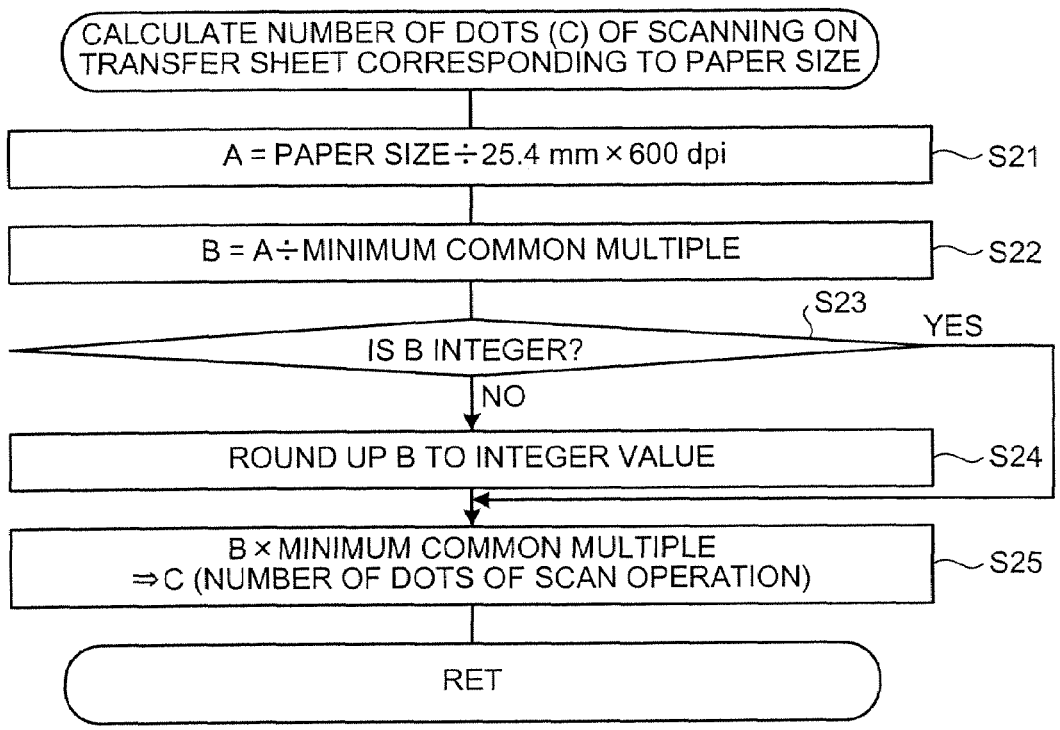

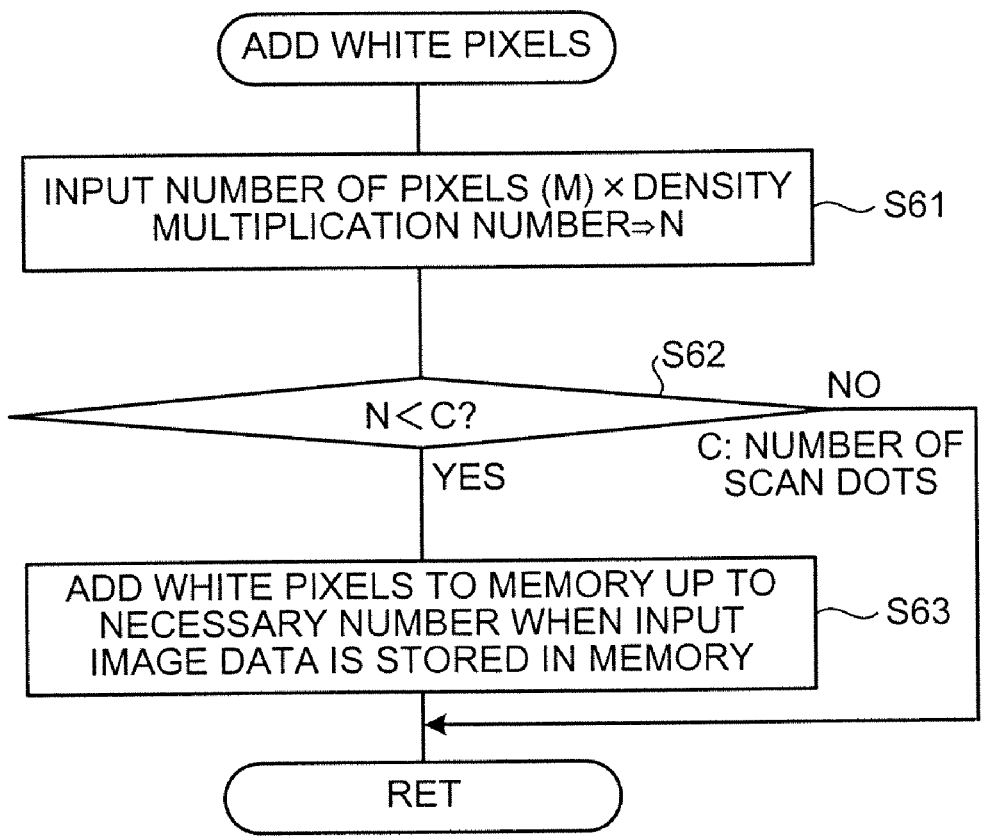

FIG.13
(RELATED ART)
TRAVELING DIRECTION OF TRANSFER SHEET
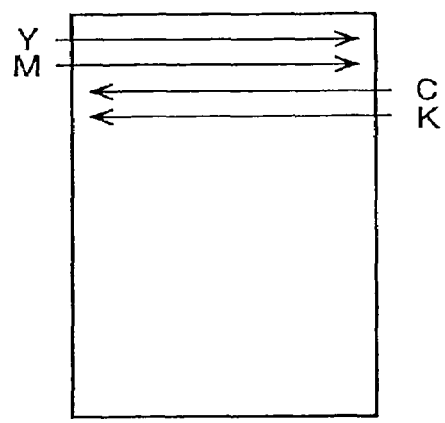
MAIN-SCANNING EFFECTIVE GATE SIGNALS OF Y AND M   t →
MAIN-SCANNING EFFECTIVE GATE SIGNALS OF C AND K   ← t

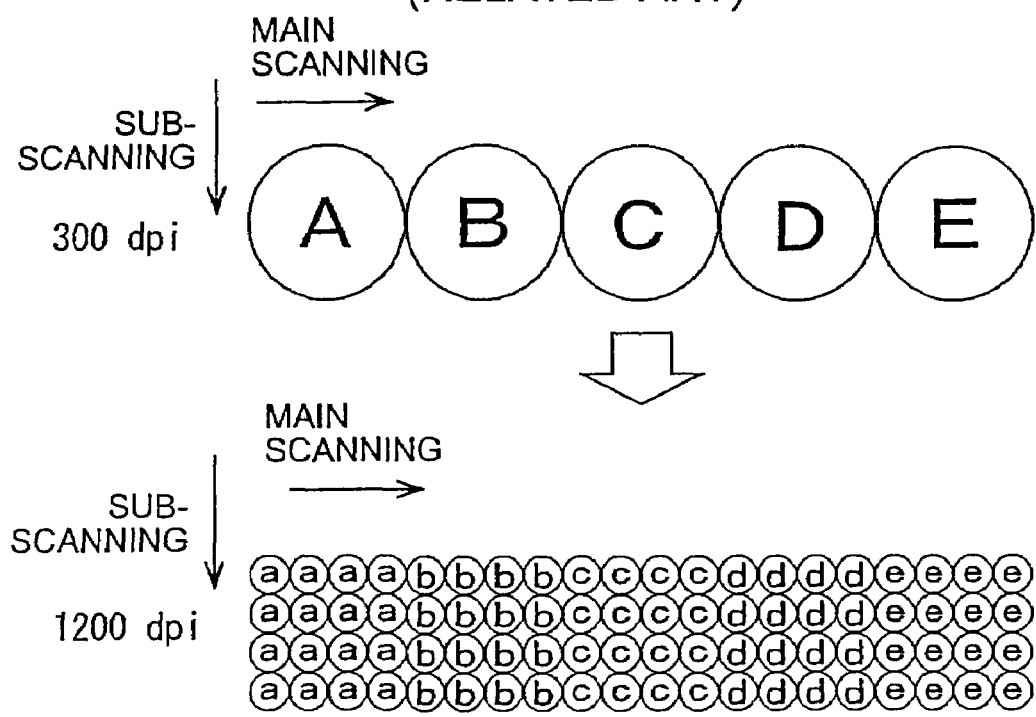

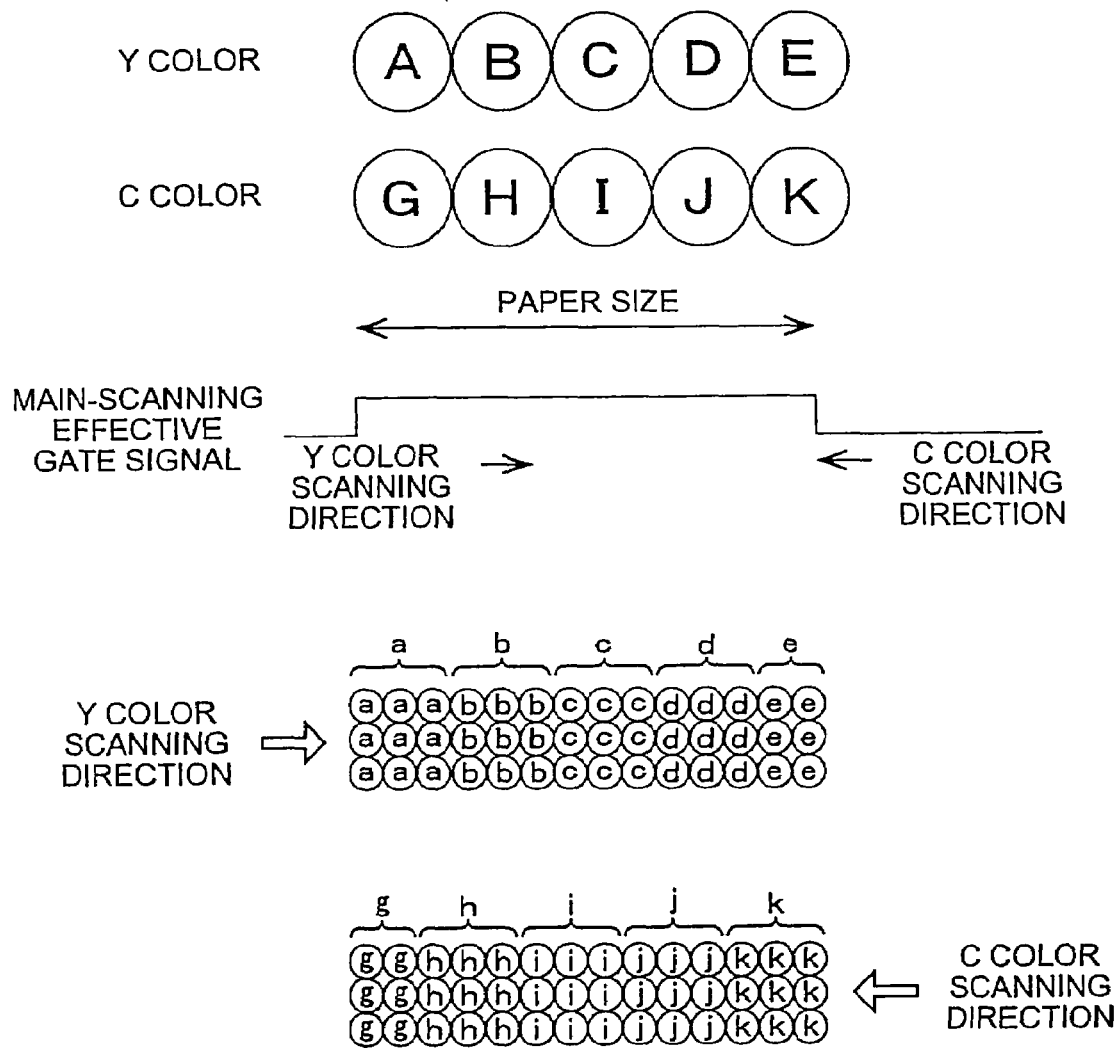

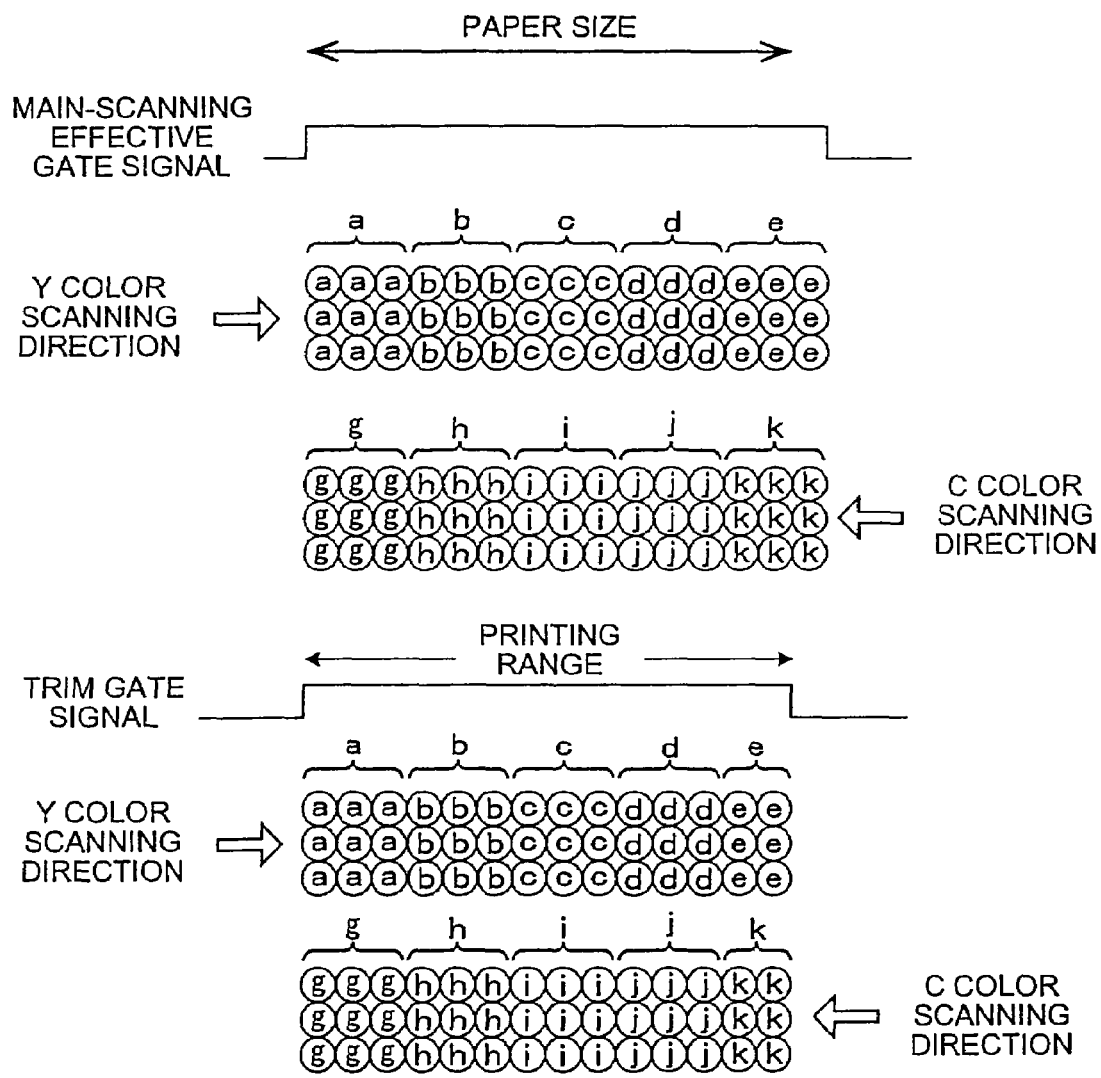

IMAGE FORMING APPARATUS AND ASSOCIATED METHODOLOGY OF FORMING AN ENLARGED IMAGE

CROSS-REFERENCE TO RELATED APPLICATIONS

The present document incorporates by reference the entire contents of Japanese priority document, 2005-243419 filed in Japan on Aug. 24, 2005.

BACKGROUND OF THE INVENTION

1. Field of the Invention

The present invention relates to an image forming apparatus and an image forming method, and, more particularly to a technology for forming an enlarged image in image forming apparatuses that perform image formation according to scanning in both forward and backward directions such as a printer and a facsimile apparatus.

2. Description of the Related Art

In image forming apparatuses such as a laser printer, it is possible to perform printing at high speed by writing respective color-separated image data on a photosensitive member with a laser beam according to opposed scanning that uses both forward direction scanning and backward direction scanning. To accurately superimpose a latent image formed by forward raster scan output and a latent image formed by backward raster scan output one on top of another, it is necessary to accurately adjust a position for starting to write the latent images. As a factor causing positional deviation, for example, an accumulated value of backlash or the like of mechanical components deviates from a range of a set value because of a change in the environment such as temperature. Therefore, when printing conditions are changed, adjustment for correcting the positional deviation is required.

In performing backward raster scan, it is necessary to read out image data stored in a buffer memory in a direction opposite to forward raster scan. As a method of reading out image data in this way, there is a method of designating a position of a rear end of effective pixels stored in the buffer memory and reading out the image data in an opposite direction from the position. When resolution of an input image and output resolution of an image forming apparatus are different, a print image is formed after performing processing for adjusting a dot density to prevent a size of the input image from changing.

When the resolution of the input image is 600 dpi, if the input image is directly printed by a printer with the resolution of 1200 dpi, length of the input image is reduced to a half. To print the input image in the same size, it is necessary to formally convert input image data with the resolution of 600 dpi into image data with the resolution of 1200 dpi. This processing is referred to as double density processing. Processing for doubling the vertical and horizontal numbers of dots, respectively, is referred to as double density processing. Processing for tripling the vertical and horizontal numbers of dots, respectively, is referred to as triple density processing. In the double density processing, an input pixel is outputted twice in a row at 1200 dpi to form a latent image with the resolution of 600 dpi. When an n-tuple density operation is performed, dot data read out from the buffer memory is repeatedly outputted n times.

A scan output period is determined according to length of a printing range of a print sheet. When the scan output period is set to an even number dot period, in the double density processing, dot data is outputted twice for all pixels. When the scan output period is an odd number dot period, dot data is outputted only once for a last pixel to complete scanning. In the case of the opposed scanning, in the forward direction scanning, one dot of the last pixel is at a right end. In the backward direction scanning, one dot of the last pixel is at a left end. Since the last one dot is divided to the left and the right of a transfer sheet, deviation in an image position occurs when a double density operation is simply performed. To prevent the deviation in an image position, it is necessary to perform correction whenever necessary. Various kinds of adjustment are performed according to combinations of a scan output period corresponding to a transfer sheet size and a density multiplication (an enlargement ratio). Therefore, control for color matching is extremely complicated.

A schematic diagram of a printing mechanism of the conventional image forming apparatus is shown in FIG. 10A. This is an example of a structure of a color image forming apparatus called a tandem type in which image forming units are arranged along a conveyor belt. Image forming units that form images of different colors (yellow: Y, magenta: M, cyan: C, and black: K), respectively, are arranged in one row along a conveyor belt 2 that conveys a transfer sheet 1. The conveyor belt 2 is supported and stretched by conveying rollers 3 and 4 and driven in an arrow direction by the rotation of the conveying rollers. One of the conveying rollers 3 and 4 is a driving roller that drives the conveyor belt 2 and the other is a driven roller. A sheet feeding tray 5, in which the transfer sheet 1 are stored, is provided below the conveyor belt 2. The transfer sheet 1 at an uppermost position stored in the sheet feeding tray 5 is fed at the time of image formation and attracted onto the conveyor belt 2 by electrostatic attraction. During the conveyance, a position of the transfer sheet 1 is detected by a registration sensor 14. The respective units are controlled to adjust operation timing to a conveyance position of the transfer sheet 1.

The transfer sheet 1 attracted on the conveyor belt is conveyed to a first image forming unit (yellow), in which formation of a yellow image is performed. The first image forming unit (yellow) includes a photosensitive drum 6Y, a charger 7Y arranged around the photosensitive drum 6Y, an exposing device 8, a developing device 9Y, and a photosensitive cleaner 10Y. The surface of the photosensitive drum 6Y is uniformly charged by the charger 7Y and, then, exposed by a laser beam 11Y corresponding to a yellow image by the exposing device 8. An electrostatic latent image is formed on the photosensitive drum 6Y. The electrostatic latent image formed is developed by the developing device 9Y and a toner image is formed on the photosensitive drum 6Y. This toner image is transferred onto the transfer sheet 1 by a transferring device 12Y in a position where the photosensitive drum 6Y comes into contact with the transfer sheet 1 on the conveyor belt 2 (a transfer position). A single color (yellow) image is formed on the transfer sheet 1. An unnecessary toner remaining on the surface of the photosensitive drum 6Y, from which the transfer of the toner image is completed, is cleaned by a photosensitive cleaner 10Y and prepared for the next image formation.

The transfer sheet 1 having the single color (yellow) image transferred thereon by the first image forming unit (yellow) is conveyed to a second image forming unit (magenta) by the conveyor belt 2. In the second image forming unit (magenta), similarly, a toner image (magenta) formed on the photosensitive drum 6M is transferred onto the transfer sheet 1 to be superimposed on the yellow toner image. The transfer sheet 1 is further conveyed to a third image forming unit (cyan) and a fourth image forming unit (black), toner images formed are transferred onto the transfer sheet 1 in the same manner, and a color image is formed. The transfer sheet 1, which has passed the fourth image forming unit to have the color image formed thereon, is peeled from the conveyor belt 2, fixed by a fixing device 13, and, then, discharged.

FIG. 10B is a conceptual diagram of an optical unit of the conventional image forming apparatus viewed from above. Light beams from a laser diode (LD) unit K 31 and an LD unit Y 32 pass through a cylinder lens CYL_K 33 and a cylinder lens CYL_Y 34 and are made incident on one surface of a polygon mirror 37 by a reflection mirror K 35 and a reflection mirror Y 36. The polygon mirror 37 rotates to deflect the light beams. The light beams pass through an fθ lens KC 38 and an fθ lens YM 39 and are returned by a first mirror K 40 and a first mirror Y 41. On the other hand, light beams from an LD unit C 42 and an LD unit M 43 pass through a cylinder lens CYL_C 44 and a cylinder lens CYL_M 45 and are made incident on another surface of the polygon mirror 37. The polygon mirror 37 rotates to deflect the light beams. The light beams pass through the fθ lens KC 38 and the fθ lens YM 39 and are returned by a first mirror C 46 and a first mirror M 47.

A cylinder mirror CYM_KC 48 and a cylinder mirror CYM_YM 49 as well as a sensor KC 50 and a sensor YM 51 are provided further on an upstream side than a writing start position in a main scanning direction. The light beams, which have passed through the fθ lens KC 38 and the fθ lens YM 39, are reflected and condensed by the cylinder mirror CYM_KC 48 and the cylinder mirror CYM_YM 49 and made incident on the sensor KC 50 and the sensor YM 51. These sensors are synchronization detecting sensors for synchronization in the main scanning direction. For the light beams from the LD unit K 31 and the LD unit C 42, the common cylinder mirror CYM_KC 48 and the common sensor KC 50 are used. For the light beams from the LD unit Y 32 and the LD unit M 43, the common cylinder mirror CYM_KC 49 and the common sensor YM 51 are used. Since the light beams of the two colors are made incident on the same sensor, angles of incidence on the polygon mirror 37 of the light beams of the respective colors are varied to change timing of incidence of the respective light beams on the sensor. The light beams are outputted as a pulse string in time series.

As it is seen from FIG. 10B, light beams of black K and cyan C and light beams of yellow Y and magenta M are used for scanning in opposite directions.

FIG. 11 is a schematic block diagram of a control unit of the conventional image forming apparatus. An image reading unit 200 that reads an original image subjects a read signal to color separation and A/D conversion in a video programming unit (VPU) 400 to perform offset correction, shading correction, and pixel position correction. The image reading unit 200 performs image processing in an image processing unit (IPU) 401. An image forming unit 300 performs control of a printer unit in a writing control ASIC 402. The image forming unit 300 performs control of a semiconductor laser in an LD control unit 403. The image forming unit 300 forms an electrostatic latent image on a photosensitive drum in an LD group 404. A central processing unit (CPU) 405 performs control of the entire apparatus. A control program is stored in a read only memory (ROM) 406. The control program temporarily uses a random access memory (RAM) 407. A read image is stored in an image memory 408. An interface (I/F) unit 409 performs interface between a system bus and the IPU. A system bus 410 performs exchange of data among the devices. A user gives instruction to the CPU 405 using an operation unit 411. Image data is subjected to color separation to be converted into print data of cyan (C), magenta (M), yellow (Y), and black (K) by the image reading unit 200. Information necessary for image formation (APC control, pixel count, P sensor pattern creation, etc.) is given to the image data subjected to the color separation by the writing control ASIC 402. Thereafter, the image data is supplied to the LD control unit 403 as LD lighting data. Turn-on and turn-off of the LD are executed based on this data.

FIG. 12 is a schematic diagram of a writing control circuit of the control unit of the conventional image forming apparatus. Memory control units 500 to 503 subject image data of respective colors from IPUs to rate conversion and format conversion. The memory control units 500 to 503 store the image data inputted from the IPUs in a memory group 505 and read the image data to perform format conversion, operating frequency conversion, and parallel-serial conversion of the image data inputted. A selector 504 switches a memory control unit to be combined with the memory group 505. The image data subjected to the parallel-serial conversion by the memory control units 500 to 503 is sent to an image edition processing unit 506. The image edition processing unit 506 carries out image processing such as jaggy correction and edge processing according to an operation mode.

A pattern generating unit 507 performs superimposition of a test pattern on an image, grant of data for process control, pixel count for measuring numbers of light emitting dots of respective LDs, and the like. Processing from output of the memory control units 500 to 503 to output of the image edition processing unit 506 operate in a single clock. The writing control circuit performs frequency conversion into a last clock using first-in first-outs (FIFOs) 520 to 527. In ON/OFF blocks, ON/OFF of the LDs, grant of light emission data for synchronization detection, and the like are performed. A start managing unit 516 performs positioning control of sub-scanning operation timing at the time of a multicolor operation. A gate control unit 517 determines operation timing of respective modules according to a synchronization signal. A CPU-I/F unit 518 manages interface between a not-shown register storing unit that determines an operation mode and a CPU that determines an operation mode.

Image data are transferred from the IPUs in synchronization with a V clock (st1). The memory control units 500 to 503 in the writing control ASIC 402 store the image data in a memory using the V clock (st2). Readout from the memory is performed in synchronization with an intermediate clock (st3). The image data pass the image edition processing unit 506 and the pattern generating unit 507 to be stored in the FIFOs 520 to 527 (st4, st5, and st6). The image data are read out from the FIFOs 520 to 527 (st7-1 to st7-8). The image data read out pass ON/OFF control units 512 to 515 to be supplied to LD driving units (st8-1 to st8-4). Respective clocks in the writing control ASIC 402 are supplied by a not-shown phase-locked loop (PLL) circuit.

FIG. 13 is a diagram for explaining a positioning method in the main scanning direction in the conventional image forming apparatus. Yellow (Y) and magenta (M) are scanned from the left side of the transfer sheet 1 and cyan (C) and black (K) are scanned from the right side of the transfer sheet 1 with respect to a traveling direction of the transfer sheet 1. Although lines corresponding to the colors are divided into four in the figure, the lines are in the same position on an actual sheet. Since the colors are scanned in this way, a scanning direction of images in the main scanning direction for cyan (C) and black (K) is opposite to a scanning direction for yellow (Y) and magenta (M). Timing for outputting the images of the respective colors is determined according to main-scanning effective gate signals. The main-scanning effective gate signals are controlled to print the images at length identical with a paper size. Pixel information equivalent to a size the main-scanning effective gate signals is supplied to the writing control ASIC 402. The writing control ASIC 402 performs scanning in the forward direction and the backward direction. The writing control ASIC 402 performs color matching by adjusting output timing of the four main-scanning effective gate signals for the respective colors.

FIG. 14 is a conceptual diagram of a density magnification operation in the conventional image forming apparatus. In an example shown in the figure, an image of quadruple density is generated to print an input image with resolution of 300 dpi using a printer with resolution of 1200 dpi. A pixel with resolution of 1200 dpi is irradiated four times in a row with respect to the main scanning direction. This is repeated for each input pixel. In a sub-scanning direction, generation of a line is repeated for four lines. Start timing of pixel output in the main scanning direction is determined according to main-scanning effective gate signals. When the main-scanning effective gate signals are asserted, scanning is started.

FIG. 15 is a diagram for explaining an operation of triple density processing in the conventional image forming apparatus. When an operation of single density is performed in the main scanning direction, a length of a main-scanning effective gate signal and a dot period of the input number of pixels are identical. Therefore, no inconsistency occurs between the number of pixels corresponding to the length of the main-scanning effective gate signal and the input number of pixels. When a triple density operation is performed, according to scanning in the backward direction, pixels of "G, H, I, J, and K" of a C color are superimposed on pixels of "A, B, C, D, and E" of a Y color by scanning in the forward direction. In this case, when the main-scanning effective gate signals have length of a fourteen pixel period, in the Y color in the forward direction, only two pixels among last pixels of "E" are outputted and the main-scanning effective gate signal is negated. On the other hand, in the C color for which scanning in the backward direction is performed, only two pixels among pixels of "G" are outputted. When pixels with triple density are superimposed, although the main-scanning effective gate signals are identical, images superimposed deviate from each other. To prevent the deviation of images, control for varying timing of the main-scanning effective gate signals in the forward direction scanning and the backward direction scanning is performed.

There is a method of setting a main-scanning effective gate signal period to a dot period integer times as large as an enlargement ratio such that the forward direction scanning and the backward direction scanning can be controlled at the same timing. This method is explained with reference to FIG. 16. In an example explained below, input image data with resolution of 400 dpi is printed by a printer with resolution of 1200 dpi in the same size. In this case, since the input image data is printed at triple density, a density multiplication is 3. Lengths of main-scanning effective scanning gate signals are set to length of a dot period of a multiple of the density multiplication "3". An example in which input image data of five dots is converted into image data of fifteen dots to be printed is schematically shown in FIG. 16. The respective dots only have to be converted into three dots. Since it is unnecessary to control the conversion to be suspended, control is simple. A portion of an image on the outside of a printing range of a print sheet is masked with a trim gate signal to control printing. With such control, the image does not extend to the outside of the printing range of the print sheet. Further, positional deviation of dots depending on colors does not occur. Besides, various methods of preventing color drift at the time of magnification have been proposed. Several examples of the conventional technologies related to the methods are explained below.

The laser-beam-scanning writing apparatus disclosed in Japanese Patent Application Laid-Open No. H9-109446 prevents color drift at the time when magnification is performed in a system for performing main scanning in opposite directions using a plurality of laser beams. A value corresponding to a writing start position in the main scanning direction by a laser beam in one direction is set in a register by a CPU in advance to substantially coincide with a writing end position in the main scanning direction by a laser beam in the opposite direction regardless of a magnifying factor at the time of magnification. When a main scanning counter is reset by a main-scanning synchronization signal, the main scanning counter starts count of a writing signal and applies a value of the count to a comparator at every count. When the count value from the main scanning counter reaches a value from the register, the comparator activates a main-scanning effective area signal.

The image forming apparatus disclosed in Japanese Patent Application Laid-Open No. H10-173909 is an apparatus that reduces an amount of transfer of image data and normally performs mirroring conversion at the time of the transfer. A bit-arrangement changing unit includes an MD bus of an 8-bit width, first to eighth eight selectors, input terminals of which are connected to the MD bus, and a D bus of an 8-bit width to which output terminals of the first to the eighth selectors are connected, respectively. The selectors select respective bit data of the MD bus based on a gradation setting signal to rearrange the bit data in bit units such that an order of image data of respective pixels is reversed at the time of the mirroring conversion, a line order is a regular order, and an order from a most significant bit to a least significant bit of image data of respective pixels is a regular order.

The image forming apparatus disclosed in Japanese Patent Application Laid-Open No. 2002-96505 is an image forming apparatus in which a change is not caused in edge processing of pixel data of an object pixel section and a reference pixel section by mirroring processing. Pixel data of an object pixel area and left and right adjacent pixel areas optically written in a raster scanning direction and recorded in a buffer memory in a forward direction are read out without the mirroring processing. Image data of a recording pixel area and left and right adjacent pixel areas optically written in a direction opposite to the raster scanning direction and recorded in the buffer memory in an opposite direction are subjected to the mirroring processing by a mirroring processing circuit and read out. The pixel data read out are subjected to image processing by a written-image processing circuit such that image data not subjected to the mirroring processing and image data subjected to the mirroring processing are symmetrical with respect to a raster scan area. An object pixel section not subjected to the mirroring processing at the time of image formation and an object pixel section subjected to the mirroring processing coincide with each other. This makes it possible to perform high-quality image formation without a defective image section such as color drift.

The image forming apparatus disclosed in Japanese Patent Application Laid-Open No. 2002-137450 is an image forming apparatus that forms images of four colors. The image forming apparatus makes color drift of images less conspicuous. The image forming apparatus includes a polygon mirror that deflects a plurality of light beams modulated according to image signals of respective colors in the main scanning direction. Light beams of at least two colors among the light beams deflected by the polygon mirror have a scanning direction opposite to that of light beams of the other colors. Image forming units form images of the respective colors. A control unit controls optical writing of a light beam scanning unit.

The light beam scanning unit performs scanning in an identical scanning direction using light beams for forming images of magenta and cyan. In correcting a writing start position in the main scanning direction, the control unit corrects, with a magenta image or a cyan image as a reference, main-scanning writing start position of the other colors.

However, in the conventional image forming apparatuses, it is necessary to perform complicated control to prevent color drift in generating an enlarged image according to opposed scanning that uses both forward direction scanning and backward direction scanning. It is also necessary to reset adjustment of color positioning every time an enlargement ratio is changed. When length of a main-scanning effective gate signal corresponding to a paper size is prepared for each density multiplication and is set as a multiple of each density multiplication such as double density and triple density, even if a paper size is identical, length of a main-scanning effective gate signal varies depending on a density multiplication and control of color matching is complicated. For example, when a double density operation is performed after a single density operation, since lengths of main-scanning effective gate signals are different, it is necessary to change setting data obtained by performing color matching in single density to setting data obtained by performing color matching in double density.

SUMMARY OF THE INVENTION

It is an object of the present invention to at least partially solve the problems in the conventional technology.

An image forming apparatus according to one aspect of the present invention includes an exposing unit that optically writes respective color-separated image data on a photosensitive drum to form a latent image by using both a forward direction scanning and a backward direction scanning; and a writing control unit that outputs input pixel data to the exposing unit a plurality of times for enlarging and printing an input image. The writing control unit includes an output unit that outputs a main-scanning effective gate signal of dot period lengths of common multiples of all available enlargement ratios; and a suppressing unit that suppresses an output of a pixel signal to an outside of a printing range.

An image forming method according to another aspect of the present invention includes forming a latent image on a photosensitive drum by optically writing respective color-separated image data on the photosensitive drum to by using both a forward direction scanning and a backward direction scanning; and outputting input pixel data a plurality of times for enlarging and printing an input image; outputting a main-scanning effective gate signal of dot period lengths of common multiples of all available enlargement ratios; and suppressing an output of a pixel signal to an outside of a printing range.

An image forming apparatus according to still another aspect of the present invention includes an exposing means for optically writing respective color-separated image data on a photosensitive drum to form a latent image by using both a forward direction scanning and a backward direction scanning; and a writing control means for outputting input pixel data to the exposing means a plurality of times for enlarging and printing an input image. The writing control means includes an output means for outputting a main-scanning effective gate signal of dot period lengths of common multiples of all available enlargement ratios; and a suppressing means for suppressing an output of a pixel signal to an outside of a printing range.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A is a flowchart of a processing procedure of enlarged printing according to the first embodiment;

FIG. 3B is a flowchart of a calculation procedure for the number of scan dots according to the first embodiment;

FIG. 9B is a flowchart of a processing procedure for printing an input image without adding white pixels to the input image according to the third embodiment;

FIG. 13 is a diagram for explaining a method of positioning in a main scanning direction in the conventional image forming apparatus;

FIG. 14 is a conceptual diagram of a double density operation in the conventional image forming apparatus;

FIG. 15 is a diagram for explaining an operation of density multiplication processing in the conventional image forming apparatus; and FIG. 16 is a diagram for explaining a method of setting a period of a main-scanning effective gate signal to a dot period integer times as large as an enlargement ratio in the conventional image forming apparatus.

DETAILED DESCRIPTION OF THE PREFERRED EMBODIMENTS

Exemplary embodiments of the present invention are explained in detail below with reference to the accompanying drawings.

An image forming apparatus according to a first embodiment of the present invention sets main-scanning effective gate signals of dot period lengths of common multiples of all available enlargement ratios and outputs a trim gate signal for designating only a printing range period of periods of the main-scanning effective gate signals to perform optical writing according to opposed scanning.

A basic structure of the image forming apparatus according to the first embodiment is the same as that of the conventional image forming apparatus. The image forming apparatus according to the first embodiment is different from the conventional image forming apparatus in that the image forming apparatus according to the first embodiment outputs a trim gate signal for setting main-scanning effective gate signals of dot period lengths of common multiples of all available enlargement ratios and designating only a printing range period of periods of the main-scanning effective gate signals.

Figure 1:
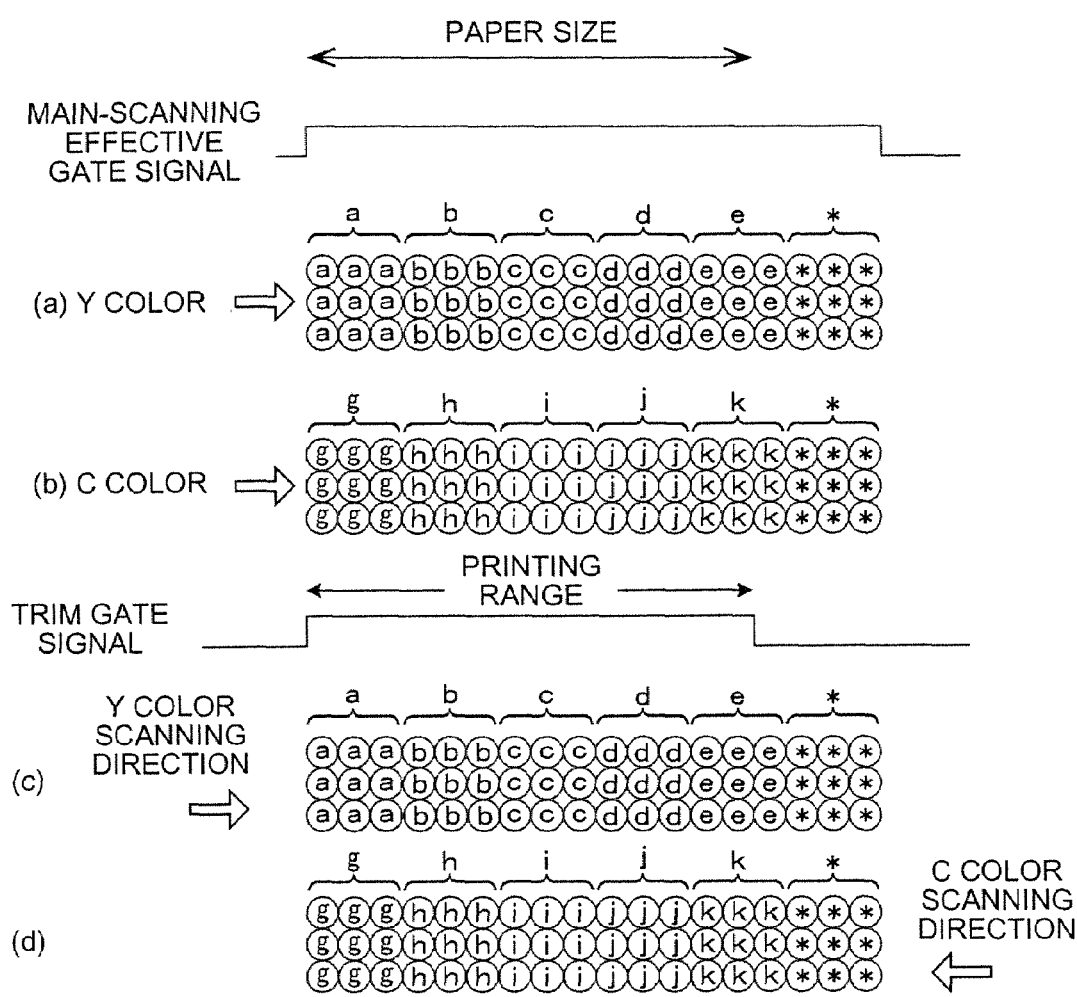
FIG. 1 is a diagram for explaining a method of setting a scan output period to a dot period of a common multiple of a density multiplication and masking a portion of an image on the outside of a printing range of a print sheet with a trim gate signal to print the image in an image forming apparatus according to a first embodiment of the present invention.
Figure 2:
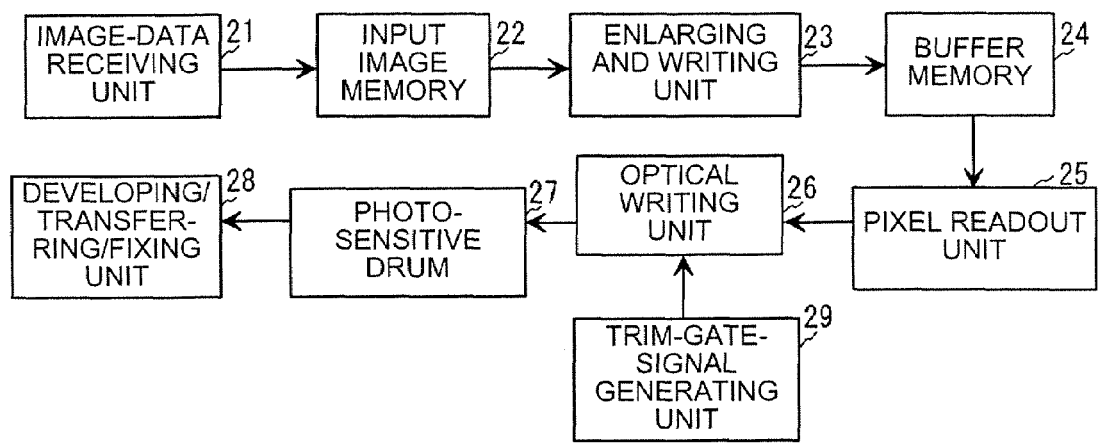
FIG. 2 is a functional block diagram of the image forming apparatus that masks an image with a trim gate signal to print the image according to the first embodiment.
Figure 3C:
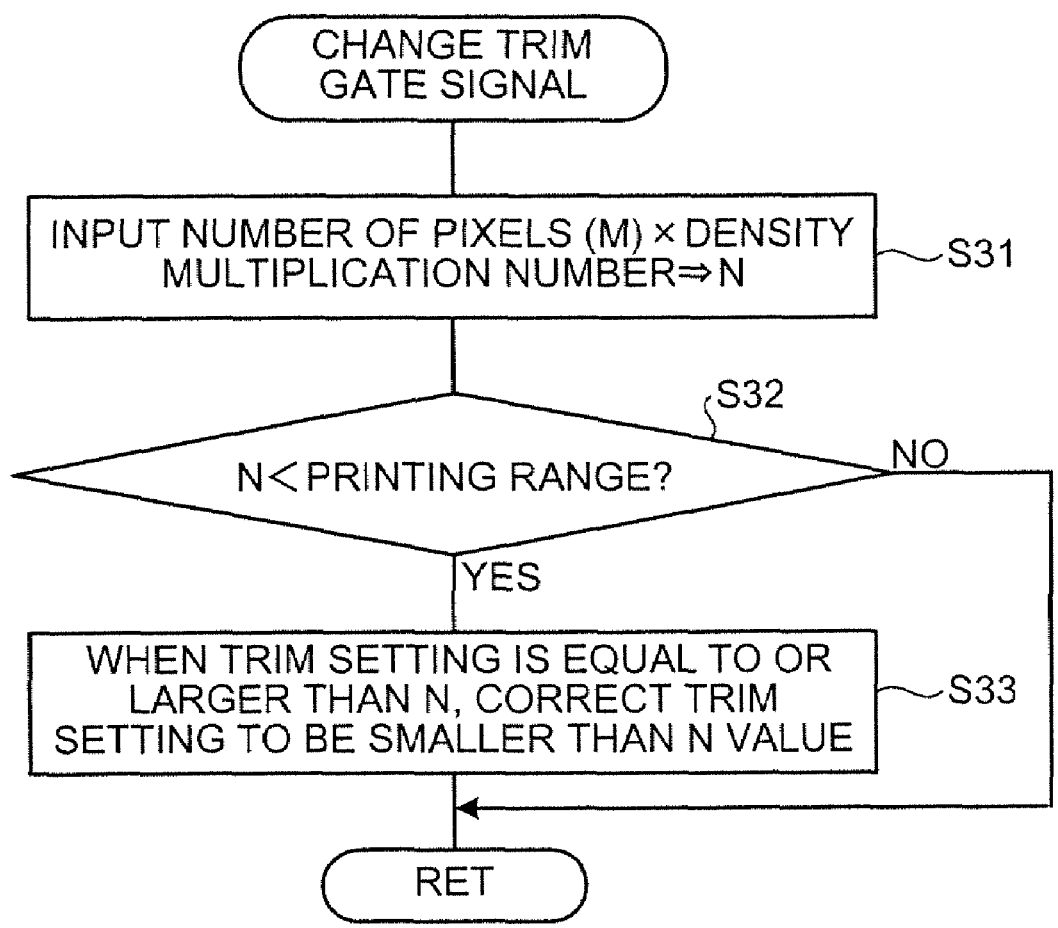
FIG. 3C is a flowchart of a procedure for changing a period of a trim gate signal according to the first embodiment.

FIG. 1 is a diagram for explaining a method of setting a scan output period to a dot period of a common multiple of a density multiplication and masking a portion of an image on the outside of a printing range of a print sheet with a trim gate signal to print the image. FIG. 2 is a functional block diagram of the image forming apparatus that masks an image with a trim gate signal to print the image. A functional structure of the image forming apparatus is shown in FIG. 2. A hardware configuration shown in FIG. 2 is the same as those shown in FIGS. 10A and 10B to FIG. 12. In FIG. 2, an image-data receiving unit 21 is a unit that receives image data to be printed from a host apparatus or the like. An input image memory 22 is a memory for storing the image data received. An enlarging and writing unit 23 is a unit that writes one pixel in a buffer memory a plurality of times according to an enlargement ratio. A buffer memory 24 is a memory that holds enlarged image data for one line. A pixel readout unit 25 is a unit that reads out pixel data from the buffer memory. An optical writing unit 26 is a unit that optically writes the pixel data on a photosensitive drum. A photosensitive drum 27 is a unit that generates an electrostatic latent image of an image. A developing/transferring/fixing unit 28 is a unit that fixes a latent image on a print sheet as an image. A trim-gate-signal generating unit 29 is a unit that generates a signal for performing control to optically write only image data in a printing range. FIGS. 3A to 3C are flowcharts of a processing procedure for masking an image with a trim gate signal to print the image.

In writing respective color-separated image data on a photosensitive member with a laser beam according to opposed scanning, backward raster scan for reading out image data stored in a buffer memory in a direction opposite to a direction of forward raster scan is performed. The backward raster scan is also referred to as mirroring conversion. A series of processing for forming a latent image from input pixels according to the backward raster scan is also referred to as mirroring processing. A writing start position of a latent image is set in a fixed position such that a latent image formed by forward raster scan output and a latent image formed by backward raster scan output can always be superimposed accurately. In other words, a scan output period is set to a dot period of a common multiple of a density multiplication, a position of a rear end of effective pixels stored in the buffer memory is set to be always the same, and image data is read out in an opposite direction from the position. An actual printing range is designated by a trim gate signal. The trim gate signal is a signal for masking image data of the forward raster scan and the backward raster scan to be limited in a printing range. Length of the trim gate signal is maximum dot period length not exceeding a printing range period. The printing range period is, for example, a dot period corresponding to 209.9 millimeters in an A4 sheet.

A method of setting a scan output period to a dot period of a common multiple of a density multiplication is explained with reference to FIG. 1. Lengths of main-scanning effective gate signals are set to lengths of dot periods of common multiples of all available density multiplications. For example, when available density multiplications are 1, 2, 3, 4, 6, and 8, common multiples are natural number times of 24. By setting lengths of main-scanning effective gate signals to a value common to paper sizes regardless of a density multiplication, it is unnecessary to change setting data in changing a density multiplication. As a control unit that controls output of a pixel signal to the outside of a printing range, a unit that outputs a trim gate signal for designating only a printing range period of periods of the main-scanning effective gate signals is provided. A portion of an image on the outside of a printing range of a print sheet is masked with a trim gate signal to control printing. With such control, the image does not extend to the outside of the printing range of the print sheet. Further, positional deviation depending on colors of dots does not occur.

A processing function of the image forming apparatus that masks an image with a trim gate signal to print the image is explained with reference to FIG. 2. The image-data receiving unit 21 receives image data to be printed from a scanner, a client apparatus, or the like and stores the image data in the input image memory 22. The enlarging and writing unit 23 reads out pixel data from the input image memory 22 and repeatedly writes the pixel data in the buffer memory 24 the number of times corresponding to a magnification for each of pixels. The pixel readout unit 25 reads out the pixel data from the buffer memory 24. The optical writing unit 26 optically writes the pixel data on the photosensitive drum 27. In that case, the optical writing unit 26 masks a portion of an image on the outside of a printing range of a print sheet with a trim gate signal from the trim-gate-signal generating unit 29 and optically writes only image data in the printing range. The developing/transferring/fixing unit 28 develops a latent image generated on the photosensitive drum 27, transfers the latent image to the print sheet, and fixes the latent image on the print sheet.

A processing procedure of enlarged printing is explained with triple density processing as an example with reference to FIG. 3A. First, the image forming apparatus receives image data from a host apparatus and inputs the image data to an input image memory. Then, the image forming apparatus extracts image data of one line from the input image memory (step S12). The image forming apparatus repeatedly writes pixel data of respective colors in the buffer memory three times for each of pixels (step S13). The image forming apparatus reads out pixel data of a Y color and an M color from the left side of the buffer memory and optically writes the pixel data on the photosensitive drum (step S14). The image forming apparatus reads out pixel data of a C color and a K color from the right side of the buffer memory and optically writes the pixel data on the photosensitive drum (step S15). The image forming apparatus returns to step S13 and repeats the processing until the processing is completed for image data for three lines (step S16). The image forming apparatus returns to step S12 and repeats the processing until the processing is completed for image data for one page (step S17). The image forming apparatus develops a latent image, transfers the latent image to a print sheet, and fixes the latent image on the print sheet (step S18).

A method of calculating the number of scan dots is explained with reference to FIG. 3B. The image forming apparatus divides a paper size (mm) by 25.4 (mm) to calculate an inch number (step S21). In the case of 600 dpi, the image forming apparatus multiplies the inch number by 600 (dpi) to calculate the number of dots (A) corresponding to the paper size. The image forming apparatus divides the number of dots (A) by a minimum common multiple of all available enlargement ratios to calculate a unit number (B) (step S22). The image forming apparatus judges whether the unit number (B) is an integer (step S23). When the unit number (B) is not an integer ("No" at step S23), the image forming apparatus rounds up the unit number (B) to an integer (step S24). The image forming apparatus multiplies the unit number (b) by the minimum common multiple to calculate the number of dots (C) of a scan operation (step S25). In this way, it is possible to calculate a necessary minimum number of dots.

A procedure for changing a period of a trim gate signal is explained with reference to FIG. 3C. The image forming apparatus multiplies the input number of pixels (M) by a density multiplication to calculate the number of dots (N) of an enlarged image (step S31). The image forming apparatus checks whether the number of dots (N) of the enlarged image is smaller than a printing range (step S32). If the number of dots (N) of the enlarged image is equal to or larger than the printing range ("No" at step S32), the image forming apparatus performs usual processing. On the other hand, if the number of dots (N) of the enlarged image is smaller than the printing range ("Yes" at step S32), the image forming apparatus changes a period of a trim gate signal according to the number of dots (N) of the enlarged image (step S33). In this way, when the enlarged image is smaller than a print sheet, it is possible to easily perform double density printing by reducing the trim gate signal without applying pre-processing to an input image.

As described above, in the first embodiment, the image forming apparatus sets main-scanning effective gate signals of dot period lengths of common multiples of all available enlargement ratios, outputs a trim gate signal for designating only a printing range period of periods of the main-scanning effective gate signals, and optically writes image data according to opposed scanning. Thus, it is possible to easily solve color drift in enlarged printing.

An image forming apparatus according to a second embodiment of the present invention sets main-scanning effective gate signals of dot period lengths of common multiples of all available enlargement ratios, outputs white pixels to the outside of a printing range at the right end of periods of the main-scanning effective gate signals, and optically writes image data according to opposed scanning.

A basic structure of the image forming apparatus according to the second embodiment is the same as that of the image forming apparatus according to the first embodiment. The image forming apparatus according to the second embodiment is different from the image forming apparatus according to the first embodiment in that the image forming apparatus according to the second embodiment outputs white pixels to the outside of a printing area at the right end of periods of the main-scanning effective gate signals. As a control unit that controls output of a pixel signal to the outside of the printing range, a unit that outputs white pixels to a period on the outside of a printing range at the right end or the left end of periods of the main-scanning effective gate signals is provided. In an example explained below, white pixels are outputted to the right side. However, it is also possible to output white pixels to the left side in the same manner.

Figure 4:
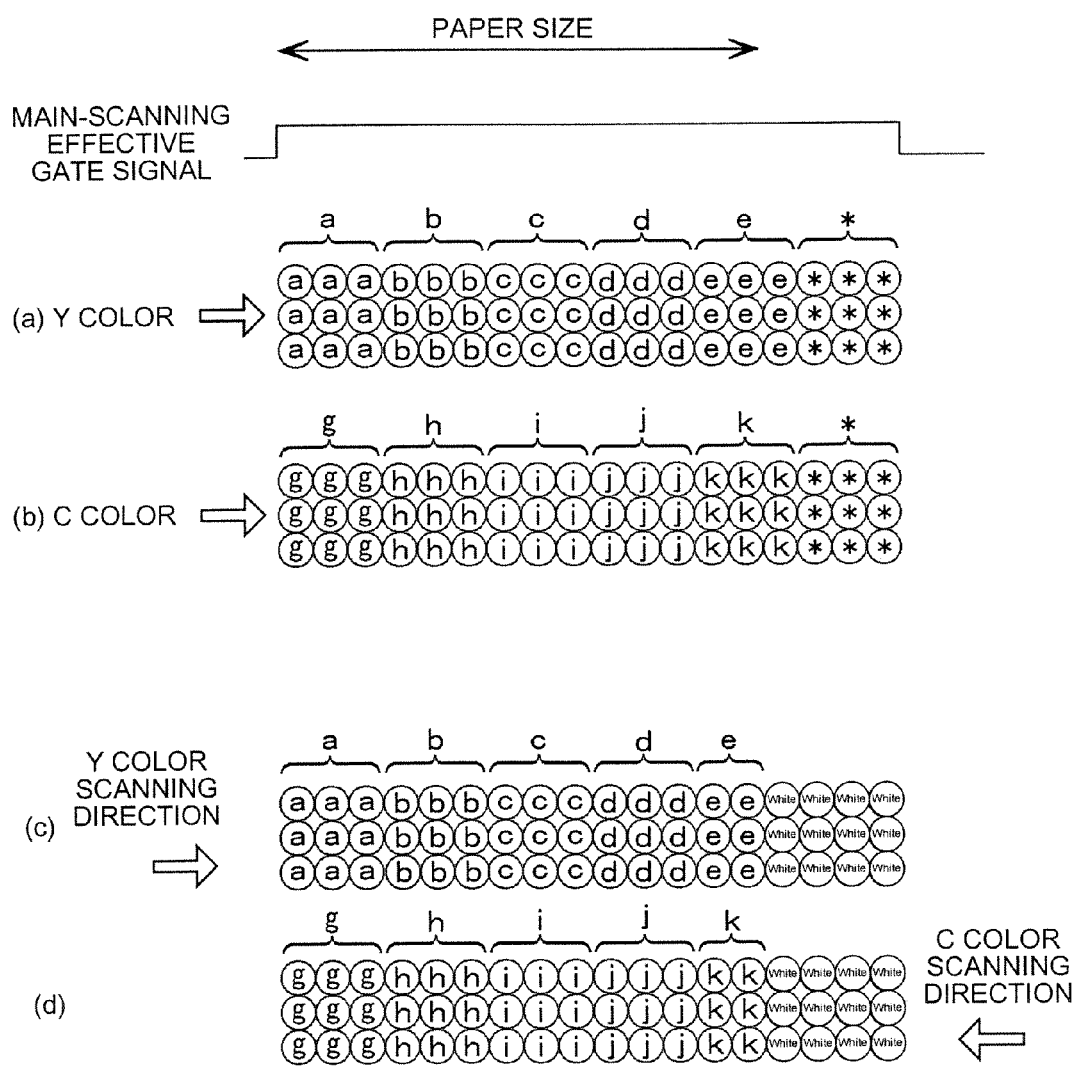
FIG. 4 diagram for explaining a method of setting a scan output period to a dot period of a common multiple of a density multiplication and adding white pixels to a right end of a printing range to print an image in an image forming apparatus according to a second embodiment of the present invention.
Figure 5:
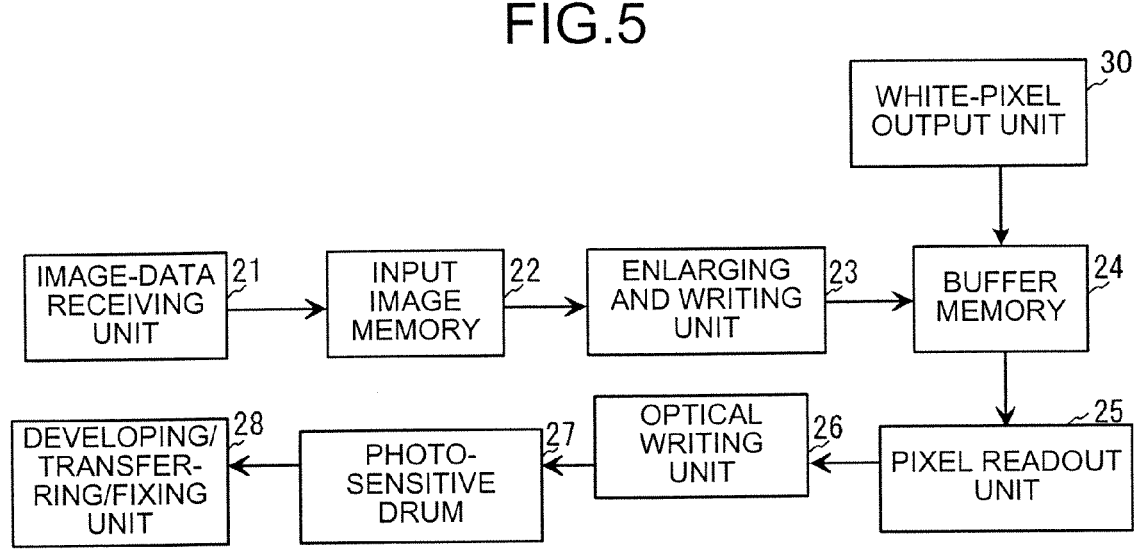
FIG. 5 is a functional block diagram of the image forming apparatus that adds white pixels to the outside of a printing range of enlarged image data to print an image according to the second embodiment.
Figure 6:
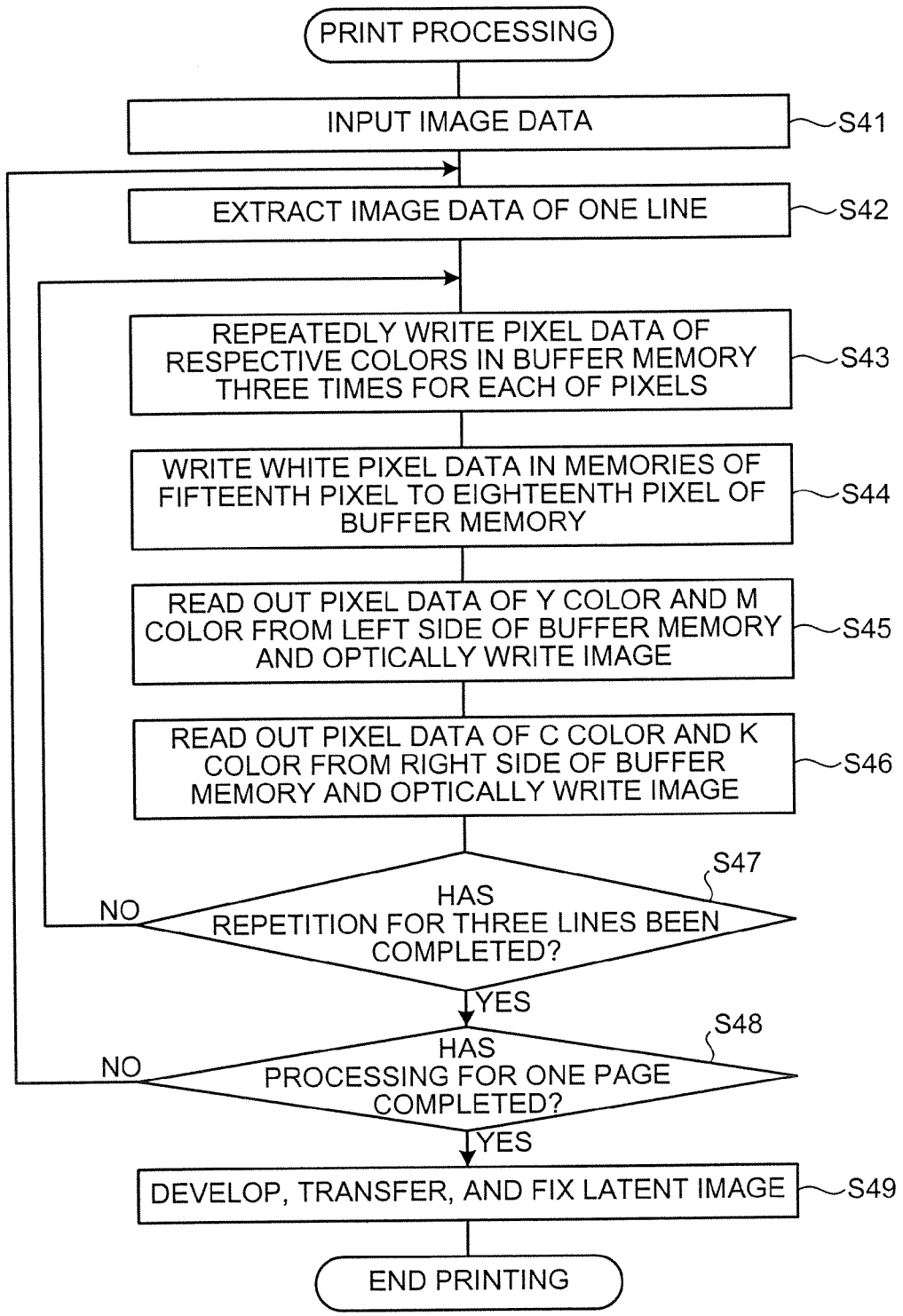
FIG. 6 is a flowchart of a processing procedure of the image forming apparatus according to the second embodiment.

FIG. 4 is a diagram for explaining a method of setting a scan output period to a dot period of a common multiple of a density multiplication and adding white pixels at the right end of a printing range to print an image. FIG. 5 is a functional block diagram of the image forming apparatus that adds white pixels to the outside of a printing range of enlarged image data to print an image. In FIG. 5, a white-pixel output unit 30 is a unit that writes white pixels in a portion outside a printing range of a buffer memory. The other components are the same as those shown in FIG. 2. FIG. 6 is a flowchart of a processing procedure for adding white pixels to the outside of a printing range of enlarged image data to print an image.

A method of setting a scan output period to a dot period of a common multiple of a density multiplication and outputting white pixels to the right end on the outside of a printing range to print an image is explained. As an example, it is assumed that a printing range is equivalent to fourteen pixels, a main-scanning effective gate signal length is equivalent to eighteen pixels, and an image is printed at triple density. Five input pixels are repeatedly stored in the buffer memory three times for each of the input pixels. Pixel data of a Y color and a C color are as shown in FIGS. 4A and 4B. Data in the remaining portion at the right end is indefinite. When white pixel data is written in memories of a fifteenth pixel to an eighteenth pixel of the buffer memory while leaving data for the fourteen pixels corresponding to the printing range as it is, the image data change as shown in FIGS. 4C and 4D. The pixel data in this buffer memory are outputted according to a main-scanning effective gate signal. For the Y color, the image data is read out from the left side and outputted. For the C color, the image data is read out from the right side and outputted. For an M color, image data is read out and outputted in the same manner as the image data of the Y color. For a K color, image data is read out and outputted in the same manner as the image data of the C color.

A processing function of the image forming apparatus that adds white pixels to the outside of a printing range of enlarged image data to print an image is explained with reference to FIG. 5. The image-data receiving unit 21 receives image data to be printed from a scanner, a client apparatus, or the like and stores the image data in the input image memory 22. The enlarging and writing unit 23 reads out pixel data from the input image memory 22 and repeatedly writes the pixel data in the buffer memory 24 the number of times corresponding to a magnification for each of the pixels. The white-pixel output unit 30 writes white pixels on the outside of a printing range of image data in the buffer memory 24. The pixel readout unit 25 reads out pixel data from the buffer memory 24. The optical writing unit 26 optically writes the pixel data on the photosensitive drum 27. The developing/transferring/fixing unit 28 develops a latent image generated on the photosensitive drum 27, transfers the latent image onto a print sheet, and fixes the latent image on the print sheet.

A processing procedure for adding white pixels to the outside of a printing range of enlarged image data to print an image is explained with triple density processing as an example with reference to FIG. 6. First, the image forming apparatus receives image data from a host apparatus or the like and inputs the image data in an input image memory (step S41). The image forming apparatus extracts image data of one line from the input image memory (step S42). The image forming apparatus repeatedly writes pixel data of respective colors in the buffer memory three times for each of the pixels (step S43). The image forming apparatus writes white pixel data in memories of a fifteenth pixel to an eighteenth pixel of the buffer memory (step S44). The image forming apparatus reads out pixel data of a Y color and an M color from the left side of the buffer memory and optically writes the pixel data (step S45). The image forming apparatus reads out pixel data of a C color and a K color from the right side of the buffer memory and optically writes the pixel data (step S46). The image forming apparatus returns to step S43 and repeats the processing until the processing is completed for image data for three lines (step S47). The image forming apparatus returns to step S42 and repeats the processing until the processing is completed for image data for one page (step S48). The image forming apparatus develops a latent image, transfers the latent image onto a print sheet, and fixes the latent image on the print sheet (step S49).

As described above, in the second embodiment, the image forming apparatus sets main-scanning effective gate signals of dot period lengths of common multiples of all available enlargement ratios, outputs white pixels to the outside of a printing range at the right end of periods of the main-scanning effective gate signals, and optically writes an image according to opposed scanning. Thus, it is possible to easily solve color drift in enlarged printing.

An image forming apparatus according to a third embodiment of the present invention sets main-scanning effective gate signals of dot period lengths of common multiples of all available enlargement ratios, adds white pixels to the right end of an input image, and optically writes an image according to opposed scanning.

A basic structure of the image forming apparatus according to the third embodiment is the same as that of the image forming apparatus according to the second embodiment. The image forming apparatus according to the third embodiment is different from the image forming apparatus according to the second embodiment in that the image forming apparatus according to the third embodiment adds white pixels to the right end of an input image. As a control unit that controls output of a pixel signal to the outside of a printing range, a unit that outputs white pixels to the right end of an input image is provided.

Figure 7:
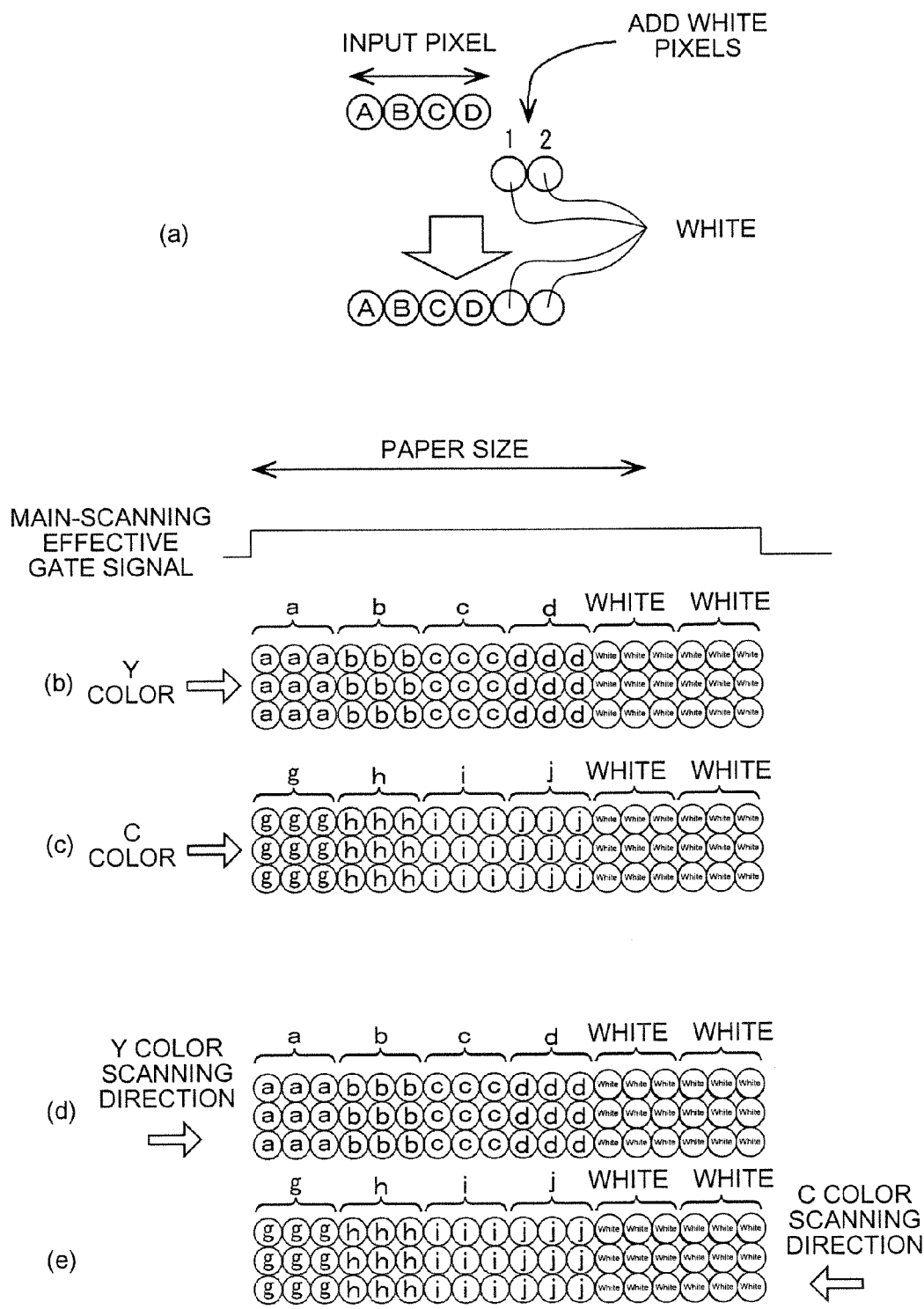
FIG. 7 is a diagram for explaining a method of adding white pixels to the outside of a printing range at a right end of input image data in an image forming apparatus according to a third embodiment of the present invention.
Figure 8:
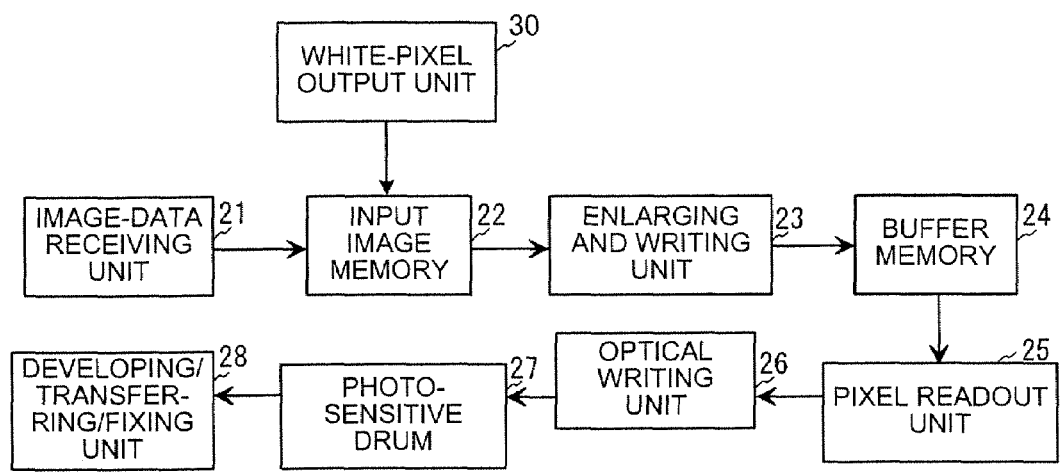
FIG. 8 is a functional block diagram of the image forming apparatus that adds white pixels to input image data to print an image according to the third embodiment.
Figure 9A:
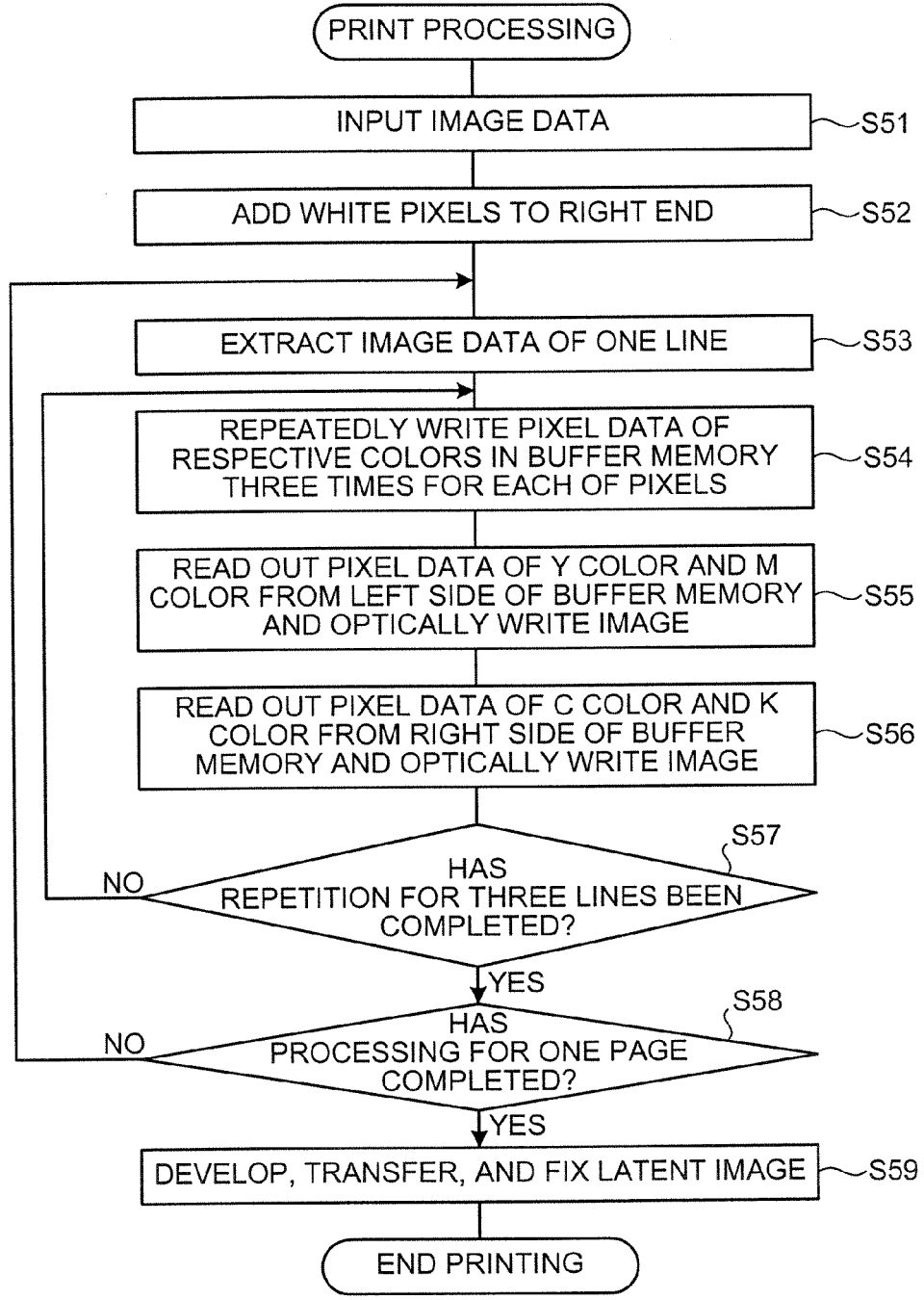
FIG. 9A is a flowchart of a processing procedure for adding white pixels to input image data to print an image according to the third embodiment.
Figure 10A:
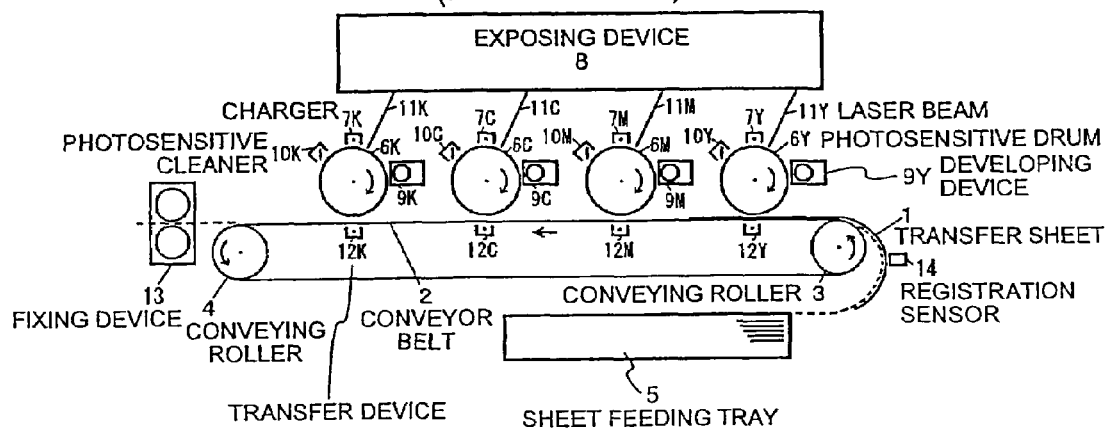
FIG. 10A is a schematic diagram of a printing mechanism of a conventional image forming apparatus.
Figure 10B:
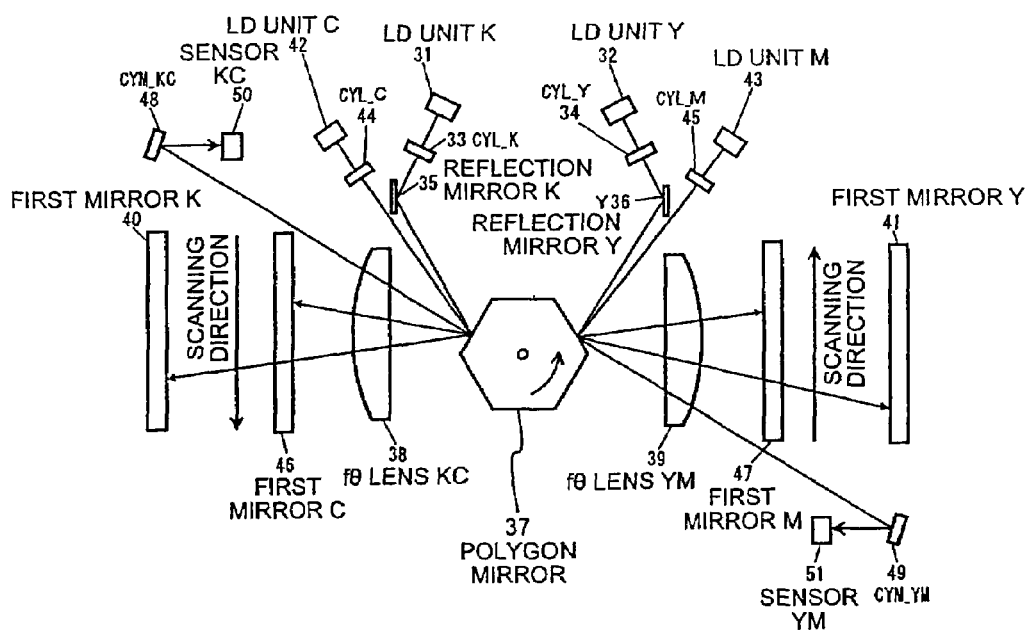
FIG. 10B is a conceptual diagram of an optical unit of the conventional image forming apparatus viewed from above.
Figure 11:
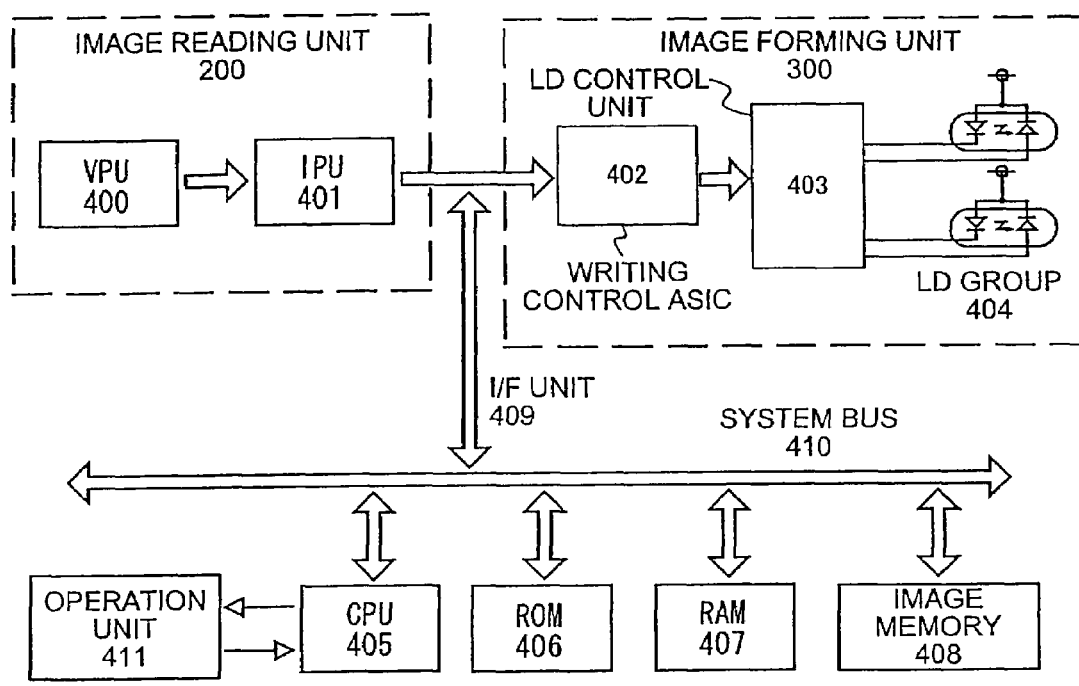
FIG. 11 is a schematic block diagram of a control unit of the conventional image forming apparatus.
Figure 12:
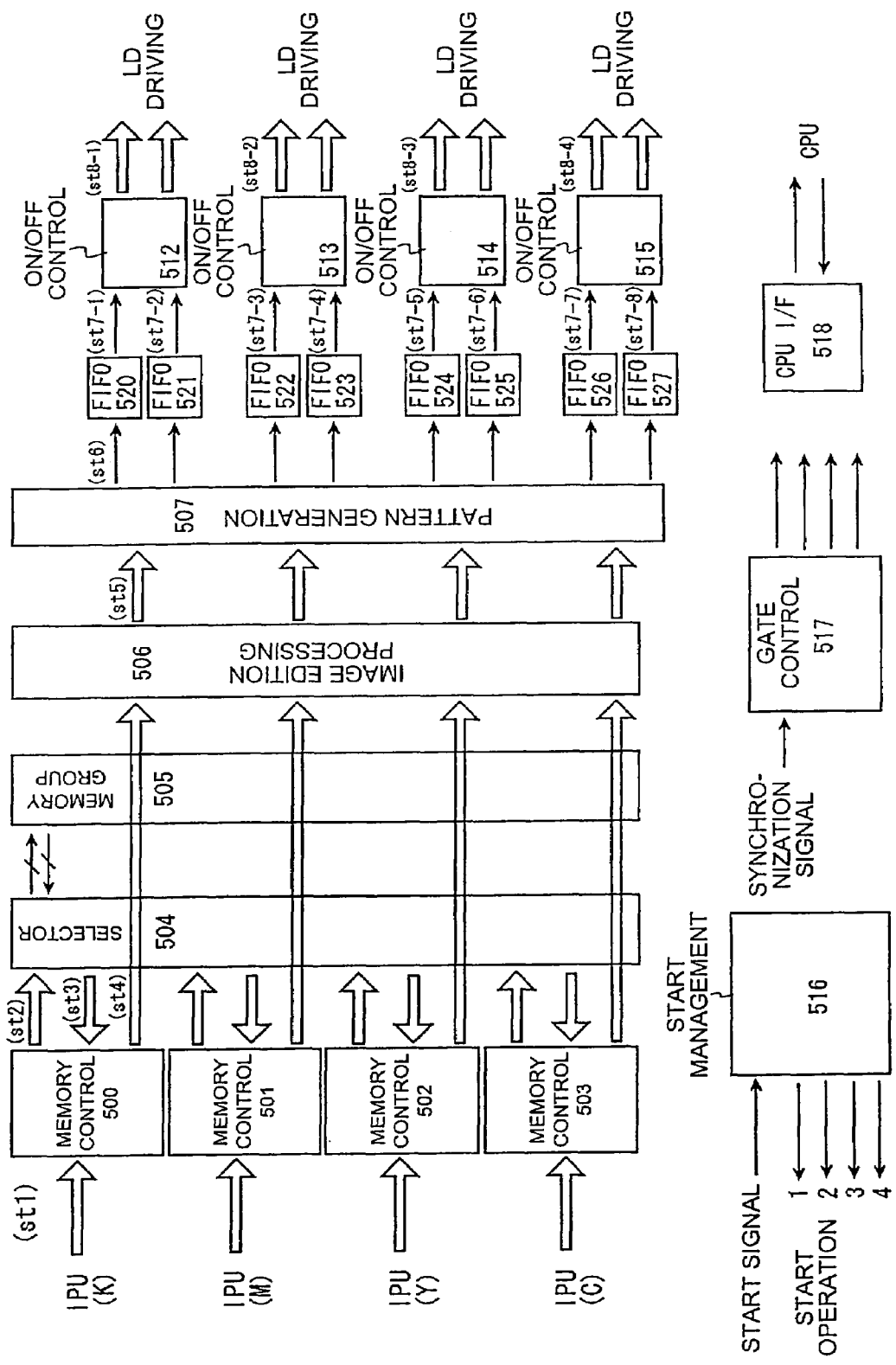
FIG. 12 is a schematic diagram of a writing control circuit of the conventional image forming apparatus.

FIG. 7 is a diagram for explaining a method of adding white pixels to the right end of input image data. FIG. 8 is a functional block diagram of the image forming apparatus that adds white pixels to input image data to print an image. In FIG. 8, the white-pixel output unit 30 is a unit that writes white pixels in the right side of an input image memory. The other components are the same as those shown in FIG. 2. FIGS. 9A and 9B are flowcharts of a processing procedure for adding white pixels to input image data to print an image.

A method of adding white pixels to the right end of input image data is explained with reference to FIG. 7. As shown in (a) in FIG. 7, the image forming apparatus adds white pixels after a last pixel "D" and writes the white pixels in the input image memory following four pixels of the input image data. The image forming apparatus reads out pixel data from the input image memory and, as shown in (b) and (c) in FIG. 7, writes the pixel data in a buffer memory a plurality of times corresponding to a magnification for each of the pixels. Since length of a main-scanning effective gate signal is equivalent to eighteen pixels, in the case of scanning in a forward direction, the pixel data is outputted in an order of "A, B, C, D, white 1, and white 2". In the case of scanning in a backward direction, the pixel data is outputted in an order of "white 2, white 1, D, C, B, and A". In the case of a Y color, as shown in (d) in FIG. 7, the pixel data is outputted in an order of "a, b, c, d, white 1, and white 2". In the case of a C color, as shown in (e) in FIG. 7, the pixel data is outputted in an order of "white 2, white 1, j, I, h, and g". "a" is data of the Y color corresponding to A. "b", "c", and "d" are data of the Y color corresponding to B, C, and D. Since the white pixels are added to the right end of the input pixels, in optically writing an image with a long main-scanning effective gate signal, the white pixels are outputted on the outside of the printing range. This makes it unnecessary to use a trim gate signal for controlling a signal on the outside of the printing range.

A processing function of the image forming apparatus that adds white pixels to input image data to print an image is explained with reference to FIG. 8. The image-data receiving unit 21 receives image data to be printed from a scanner, a client apparatus, or the like and stores the image data in the input image memory 22. The white-pixel output unit 30 writes white pixels on the right side of the input image data. The enlarging and writing unit 23 reads out pixel data from the input image memory 22 and repeatedly writes the pixel data in the buffer memory 24 the number of times corresponding to a magnification for each of the pixels. The pixel readout unit 25 reads out pixel data from the buffer memory 24. The optical writing unit 26 optically writes the pixel data on the photosensitive drum 27. The developing/transferring/fixing unit 28 develops a latent image generated on the photosensitive drum 27, transfers the latent image onto a print sheet, and fixes the latent image on the print sheet.

A processing procedure for adding white pixels to input image data to print an image is explained with reference to FIG. 9A. First, the image forming apparatus receives image data from a host apparatus or the like and inputs the image data in an input image memory (step S51). The image forming apparatus writes white pixel data at the right end of input pixels (step S52). The image forming apparatus extracts image data of one line from the input image memory (step S53). The image forming apparatus repeatedly writes pixel data of respective colors in the buffer memory three times for each of the pixels (step S54). The image forming apparatus reads out pixel data of a Y color and an M color from the left side of the buffer memory and optically writes the pixel data (step S55). The image forming apparatus reads out pixel data of a C color and a K color from the right side of the buffer memory and optically writes the pixel data (step S56). The image forming apparatus returns to step S54 and repeats the processing until the processing is completed for image data for three lines (step S57). The image forming apparatus returns to step S53 and repeats the processing until the processing is completed for image data for one page (step S58). The image forming apparatus develops a latent image, transfers the latent image onto a print sheet, and fixes the latent image on the print sheet (step S59).

A procedure of print processing for not adding white pixels to an input image is explained with reference to FIG. 9B. The image forming apparatus multiplies the input number of pixels (M) by a density multiplication to calculate the number of dots (N) of an enlarged image (step S61). The image forming apparatus checks whether the number of dots (N) of the enlarged image is smaller than the number of dots (C) of a main-scanning effective gate signal (step S62). If the number of dots (N) of the enlarged image is equal to or larger than the number of dots (C) of the main-scanning effective gate signal ("No" at step S62), the image forming apparatus does not add white pixels. On the other hand, if the number of dots (N) of the enlarged image is smaller than the number of dots (C) of the main-scanning effective gate signal ("Yes" at step S62), the image forming apparatus adds white pixels on the right side of the input image (step S63). In this way, when the enlarged image is equal to or larger than length of a main-scanning effective signal, it is possible to omit addition of white pixels.

As described above, in the third embodiment, the image forming apparatus sets main-scanning effective gate signals of dot period lengths of common multiples of all available enlargement ratios, adds white pixels at the right end of an input image, and optically writes an image according to opposed scanning. Thus, it is possible to easily solve color drift in enlarged printing.

The image forming apparatus of the present invention is most suitable as a printer or a facsimile apparatus that forms an enlarged image according to scanning in both forward and backward directions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an exposing unit configured to optically write respective color-separated image data on a photosensitive drum to form a latent image by using both a forward direction scanning and a backward direction scanning; and
   a writing control unit configured to output input pixel data to the exposing unit a plurality of times for enlarging and printing an input image, wherein
   the writing control unit includes
      an output unit configured to output a main-scanning effective gate signal of dot period lengths of common multiples of all available enlargement ratios; and
      a suppressing unit configured to suppress an output of a pixel signal outside of a printing range.

2. The image forming apparatus according to claim 1, wherein
   the suppressing unit is configured to output a trim gate signal for designating only a printing range period from among periods of the main-scanning effective gate signals.

3. The image forming apparatus according to claim 2, wherein
   the trim gate signal has a maximum dot period length not exceeding the printing range period.

4. The image forming apparatus according to claim 2, wherein
   the trim gate signal has a dot period length corresponding to a size of an enlarged input image and not exceeding the printing range period.

5. The image forming apparatus according to claim 1, wherein
   the control unit includes a blanking unit configured to output a plurality of white pixels in a period on the outside of the printing range at a left end of a period of the main-scanning effective gate signal.

6. The image forming apparatus according to claim 5, wherein
   the blanking unit is configured to output the white pixels in such a manner that an effective pixel does not exceed a printing range period.

7. The image forming apparatus according to claim 1, wherein
   the control unit includes a blanking unit configured to output a plurality of white pixels in a period on the outside of the printing range at a right end of a period of the main-scanning effective gate signal.

8. The image forming apparatus according to claim 7, wherein
   the blanking unit is configured to output the white pixels in such a manner that an effective pixel does not exceed a printing range period.

9. The image forming apparatus according to claim 1, wherein
   the control unit includes a blanking unit configured to output a plurality of white pixels to a right end of the input image.

10. The image forming apparatus according to claim 9, wherein
    the blanking unit is configured to output the white pixels in such a manner that an effective pixel does not exceed a printing range period.

11. An image forming method comprising:
    forming a latent image on a photosensitive drum by optically writing respective color-separated image data on the photosensitive drum using both a forward direction scanning and a backward direction scanning;
    outputting input pixel data a plurality of times for enlarging and printing an input image;
    outputting a main-scanning effective gate signal of dot period lengths of common multiples of all available enlargement ratios; and
    suppressing an output of a pixel signal outside of a printing range.

12. The image forming method according to claim 11, wherein
    the suppressing includes outputting a trim gate signal for designating a printing range period from among periods of the main-scanning effective gate signals.

13. The image forming method according to claim 12, wherein
    the trim gate signal has a maximum dot period length not exceeding the printing range period.

14. The image forming method according to claim 12, wherein
    the trim gate signal has a dot period length corresponding to a size of an enlarged input image and not exceeding the printing range period.

15. The image forming method according to claim 11, further comprising:
    outputting a plurality of white pixels in a period on the outside of the printing range at a left end of a period of the main-scanning effective gate signal.

16. The image forming method according to claim 15, wherein
    the outputting white pixels includes outputting the white pixels in such a manner that an effective pixel does not exceed a printing range period.

17. The image forming method according to claim 11, further comprising:
    outputting a plurality of white pixels in a period on the outside of the printing range at a right end of a period of the main-scanning effective gate signal.

18. The image forming method according to claim 17, wherein the outputting white pixels includes outputting the white pixels in such a manner that an effective pixel does not exceed a printing range period.

19. The image forming method according to claim 11, further comprising:
   outputting a plurality of white pixels to a right end of the input image.

20. An image forming apparatus comprising:
   an exposing means for optically writing respective color-separated image data on a photosensitive drum to form a latent image by using both a forward direction scanning and a backward direction scanning; and
   a writing control means for outputting input pixel data to the exposing means a plurality of times for enlarging and printing an input image, wherein
   the writing control means includes
      an output means for outputting a main-scanning effective gate signal of dot period lengths of common multiples of all available enlargement ratios; and
      a suppressing means for suppressing an output of a pixel signal to an outside of a printing range.

* * * * *